United States Patent Office 3,422,027
Patented Jan. 14, 1969

3,422,027
NOVEL COMPOSITIONS AND THEIR USE IN PREVENTING AND INHIBITING FOAM
Elemer Domba, Olympia Fields, Ill., assignor to Nalco Chemical Company, Chicago, Ill., a corporation of Delaware
No Drawing. Continuation-in-part of application Ser. No. 391,796, Aug. 24, 1964. This application Feb. 15, 1967, Ser. No. 616,186
U.S. Cl. 252—321       8 Claims
Int. Cl. B01d 19/04; C07f 5/04; C07f 7/04

ABSTRACT OF THE DISCLOSURE

This invention is directed to new compositions containing silicon and boron in the form of polymeric esters. These compounds have the structural formula:

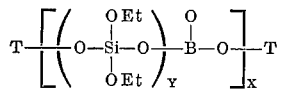

where X is an integer ranging from 10 to 200, Y is an integer ranging from 4 to 15 and R is an organic alkyl radical ranging from 1 to 18 carbon atoms. T may be either

R— or

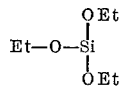

The polymer itself is best described as a polyoxyethylsilicoxyalkylboroxy oligomer having the above repeating units.

These compositions are useful in defoaming a wide variety of industrial systems which tend to foam. The invention is also concerned with preparative techniques for making the above-described compounds.

---

This application is a continuation-in-part of my earlier filed, co-pending application, Ser. No. 391,796 filed Aug. 24, 1964, and now abandoned.

THE DISCLOSURE

This invention is concerned with new compositions and their use in inhibiting and preventing foaming problems. More particularly, the instant invention relates to modified silica compositions, particularly valuable in inhibiting and preventing foaming of aqueous industrial processes.

It is known that many industrial systems are particularly susceptible to foaming problems even under mild conditions of agitation. In their more serious aspects these problems become a substantial drawback in not allowing full utilization of the particular equipment involved. Also, in many instances operating conditions are so altered by foam that considerable interference with the process itself is caused, with resultant low capacity and considerable economic loss. Serious foaming sometimes occurs, for example, when solvents or unreacted starting materials are stripped off either in vacuo or under atmospheric conditions, leaving behind the desired industrial product. For example, foaming of a considerable magnitude occurs when organic solvents are used in preparing aqueous latex emulsions and/or unreacted monomer are removed by heat distillation, vacuum flashing, steam stripping or through other concentration techniques.

Many other disadvantages are involved in the use of prior art antifoam treatments. Some of the substances break down chemically and physically. These products of degradation may debilitate the parent active component or cause foaming problems due to their own foam encouraging properties.

Other antifoam compositions cannot be employed in certain areas due to the fact that they are quickly adduced from the area which needs control such as by heat distillation, or have little or no dispersibility, much less permanent dispersibility in the medium to be treated.

Lastly, many defoaming or foam-inhibiting substances must be employed in relatively large amounts to give effective control, or else cause difficult process control problems because they are ineffective unless added in certain critical amounts.

It would be, therefore, a beneficial advance in the antifoaming art if a single substance could be found which is relatively general in its application, has good chemical and physical stability, excellent dispersibility or solubility in the environment to be treated, and yet need only be applied in relatively low amounts to give effective control.

It would be an extreme advantage to the art if an antifoam substance could be discovered which may be usefully employed, particularly in troublesome aqueous systems which have a strong tendency to foam, such as aqueous latex emulsions and in various systems used in processing paper pulp and the like.

In order to counteract foaming problems of the type discussed above and others, it is oftentimes necessary to resort to chemical treatment to both abate the existing foam and prevent its recurrence. However, many of the chemical treatments are limited in their application insofar as only one of the aforementioned effects takes place. That is, either immediate foam abatement occurs without continuing foam prevention, or a treatment will provide continuous foam protection but is of no great use in dissipating already formed foam. Therefore, in many instances it is necessary to resort to at least two or more specific chemicals acting as adminicles to one another in order to achieve both foam abatement and foam inhibition in a system under treatment. However, this resort to multi-component treatment in order to achieve the required scope of activity often leads to further problems such as dispersibility of the compounds both in each other and in the particular system to be controlled. In addition, costly time and manpower must be spent in compounding these multi-component antifoam treating compositions.

Another serious disadvantage of prior art compositions is their inability to be applied generally in a wide variety of industrial systems and processes. For example, organo-silicone condensation products or organopolysiloxanes such as silicone and silicate polymers, while possessing foam depressant or antifoam activity in certain media are relatively inactive in other environments. Also, the above compositions and particularly silicones are costly, and often economics dictate use of certain other substances.

OBJECTS OF THE INVENTION

It therefore becomes an object of the invention to provide stable, easily-dispersible antifoam compounds which have rather general application without recourse to other antifoam aids.

Another object of the invention is to provide novel compositions of matter which may be used to simultaneously defoam and inhibit foam in widely variable processes.

A specific object of the invention is to provide siliceous type compounds which may be used in aqueous systems particularly susceptible to foaming problems such as aqueous latex emulsions, paper pulp streams, etc.

THE INVENTION

In accordance with the invention, a novel class of siliceous compounds have been discovered which is admirably suited for use in defoaming and foam inhibition activities. These new compounds may be used as antifoam agents without resort to combination with other ingredients and may be used in a wide variety of industrial processes which are accompanied by foaming problems. In general, these siliceous antifoamers are products derived from the reaction of a boron compound and a polyethyl silicate. These reaction products find use both as defoaming agents, that is, in abating a system already in a foaming state or in inhibiting or preventing foam formation before such a condition occurs. Both roles may, of course, be performed simultaneously.

These products, as indicated in the Abstract of the Disclosure, have the following general formula:

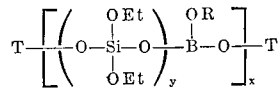

where X is an integer ranging from 10 to 200, Y is an integer ranging from 4 to 15 and R is an organic alkyl radical ranging from 1 to 18 carbon atoms. T may be either

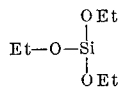

The polymer itself is best described as a polyoxyethylsilicoxyalkylboroxy oligomer having the above repeating units.

The boron compound used to form the antifoam compositions of the invention by reaction with polyethyl silicate may be chosen from among trialkyl borates or boric anhydride. The trialkyl borate compounds may have similar or different radicals attached to the boron atom. It is preferred however that each of the three radicals attached to the boron be identical. Typical trialkyl borates useful as reactants include trimethyl borate, triethyl borate, triisopropyl borate, tripropyl borate, tributyl borate, trioctyl borate, tridodecyl borate, etc. The most preferred boron reactants are boric anhydride itself and triethyl borate. When boric anhydride is employed as a condensing agent with the polyethyl silicate, during the reaction ethanol is given off. The ethanol in turn reacts with the OH radical attached to the boron atom to produce the corresponding —B—OEt grouping either prior to reaction with the polyethyl silicate polymer and/or after the boron atom has already been made part of the polymer itself.

The other reactant used in forming the antifoam compositions of the invention is a polyethyl silicate. Preferred materials are those having an average molecular weight ranging from 300 to 2000 and more preferably from 400 to 1500. These polysilicate materials are generally derived from controlled hydrolysis of silicon tetrahalides and particularly silicon tetrachloride in aqueous-ethanolic solutions. A mixture of polymeric materials is formed, but the predominant species has the following general formula:

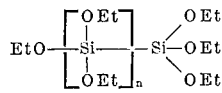

wherein $n$ is an integer ranging from about 4 to about 15 and Et represents the $C_2H_5$ group. In addition other lower molecular weight polysiloxanes may be present which may be termed, for convenience, hydrolyzate condensation products of the starting silicon tetrahalide reactants. These hydrolyzate condensation products generally contain terminal hydroxyl groups. More preferred polyethyl silicate mixtures therefore have at least 1% of their weight composed of free reactive hydroxyl groups and most preferably at least 2%. A typical ethyl silicate polymer has 2–3% of its molecular weight composed of hydroxyls. These reactive hydroxyl containing compounds are believed to act as "bridge" reactants between the boron and polyethyl silicate compositions represented by the above formula. In effect, these low molecular weight polysiloxanes which contain reactive hydroxyl groups promote further polymerization as well as reaction of the boron with the polyethyl silicate polymers.

Likewise, these above polysilicate materials may be defined solely in terms of their available silica content expressed as $SiO_2$. In materials of this type, as the extent of polymerization increases, silica content, expressed as $SiO_2$ likewise proportionally increases. Preferred polyethyl silicates have an available silica content, expressed as $SiO_2$, ranging from 35% by weight of the overall molecule weight to about 55% by weight. More preferred materials have $SiO_2$ contents within a range of 35–45%.

Most preferably, the $SiO_2$ content of the polyethyl silicate reactant ranges from about 38% to about 42% by weight. As a comparison a pure monomeric tetraortho silicate ester has a silica content ($SiO_2$) of approximately 28% by weight. Thus, by the term "polyethyl silicate" is meant a composition mixture characterized by the above distinguishing physical and chemical properties which is usually formed by controlled ethanolic hydrolysis of silicon tetrahalide or similar monomeric derivatives.

A preferred starting polyethyl silicate reactant which has been found to be extremely valuable in preparing antifoam compositions of the invention is sold under the trademark "Ethyl Silicate 40." This compound is a mixture of ethylpolysilicate having about 40% available silica expressed as $SiO_2$ and is synthesized from the controlled hydrolysis of tetraethylortho silicate or tetrachlorosilicon. This polyethyl silicate is generally described as a mixed polymer of ethyl silicate with an average of 5 silicon atoms per molecule.

One specific source of this material has a specific gravity at 20° C. of 1.0558, a freezing point of −90° C., a viscosity at 20° C. of 3.9 cps. and a refractive index at 20° C. of 1.3965. This particular polymeric substance was derived from the controlled hydrolysis of silicon tetrachloride in 95% ethanol and 5% water.

PREPARATION OF THE COMPOSITIONS

The antifoam compositions of the invention are prepared by heating one or more of the above described boron compounds and the polyethyl silicate reactant together at temperatures preferably from about 70° C. to about 250° C. The time of heating may be varied over a wide range, but preferably is carried out in from about 2 to about 12 hours. The most preferred products are prepared by heating from 5 to about 10 hours. Vacuum may also be employed during the heating step to measured levels as low as 5 mm. of mercury. Excellent products have been prepared by heating the two reactants at pot temperatures ranging from 80 to 200° C. over a period of 6–10 hours.

During the reaction the lower molecular weight silicate polymers having free reactive hydroxyl groups which help to induce molecule reactivity, condense with the boron molecule to "build" in boron atoms into the final polymeric structure via an —O—B—O— bonding. As the reaction proceeds, alcohol such as ethanol is removed along with low boiling polyethylsilicate fractions. The final product then is a 100% active, slightly viscous liquid, free of inactive recrement or diluents, which may be directly employed as an antifoam in various industrial processes.

Preferred products of the invention may be prepared by reacting from about 1.0% to about 20% by weight of the boron and from about 80% to about 99% by weight of the polyethyl silicate reactant, both percentages being based on total reaction mass weight. More preferred reaction masses are composed of 1–10% by weight of boron and 90–99% by weight of the prepolymerized polyethyl silicate.

It has also been discovered that the reaction between the boron compound and polyethyl silicate may be made materially more rapid if it is run in the presence of a finely divided silica. The silica, which is believed to act in the nature of a catalyst, should generally have a large surface area of at least 20 m.$^2$/g. and usually in excess of 120 m.$^2$/g. The particle surface area may be run as high as 500–600 m.$^2$/g. When the finely divided, high surface area silica is present, the reaction is generally speeded up to about 15–75% over those runs involving no silica.

The silica catalyst may be chosen from a variety of well-known forms of silica. For example, a precipitated silica may be used, as for example, one prepared by peptizing a colloidal silica sol. Other suitable silica reactants are silica aerogels. These are silicas which are colloidal in nature and are generally prepared by replacing the water of a silica hydrogel with a low boiling organic liquid, miscible in water, followed by heating the resultant product in an autoclave above the critical temperature of the liquid. A particularly preferred type of silica reactant is a fume silica. This is a silica capable of being put into colloidal form, which is obtained by burning silicon tetrachloride and collecting the resulting silica smoke. A similar product may be obtained by burning a tetraorthosilicate at extremely high temperature.

One specific silica substance having found particular utility in increasing the reactivity of the boron and polyethyl silicate is a commercial product sold under the trade name "Cab–O–Sil." This type of silica is almost substantially chemically pure silica, expressed in terms of $SiO_2$ and is made up of extremely fine, well-defined particles. This material is produced by a vapor phase hydrolysis process of heating silicone tetrachloride in a furnace at 1100° C. The individual separate particles of silicone dioxide, which are formed almost instantly, are collected in a cyclone. Table I below gives specific chemical and physical characteristics of this material.

TABLE I

Silica content (moisture-free basis) .99.0–99.7%.
Free moisture (105° C.) _____0.2–1.5%.
Ignition loss at 1000° C. (excluding moisture) _____0.2–1.0%.
CaO, MgO, $Na_2O$ _____0.0%.
$Fe_2O_3+Al_2O_3$ _____0.01%.
Particle size range _____0.015–.020 micron.
Surface area (nitrogen absorption) .175–200 sq. meter/g.
Specific gravity _____2.1.
Color _____White.
Refractive index _____1.55.
pH (4% aqueous dispersion) _____3.5–4.2.
Oil absorption (Gardner method)
 figment _____150 lbs. oil/100 lbs.
Bulking value _____0.057 gal./lb.

When finely divided silica is used to increase reactivity of boron and polyethyl silicate, generally from about 0.1% to about 10.0% by weight of silica is employed based on total reaction mass weight. More preferably, 0.1–5% by weight of silica is used. It is understood, of course, that the products of the invention may nevertheless be synthesized without employment of silica whose use is solely that of speeding up the reaction time.

The following examples state typical modes of preparation representative antifoam compositions of the invention.

Example I

A reactor was charged with 94 pounds of "Ethyl Silicate 40," 3.0 pounds of boric anhydride, and 3.0 pounds of "Cab–O–Sil." The mixture was heated with stirring, and ethanol began to distill over at 79° C. When alcohol no longer distilled over, the temperature of the reaction mixture was increased to 200° C. At this time, the vapor temperature rose to 120–130° C. but was not allowed to exceed 130° C. The aforementioned pot temperature was maintained until a total reaction time of approximately 6½ hours was reached. The product, falling within the above listed structural formula where R is ethyl, was then cooled and drummed. Excellent antifoam activity was noted with direct use of this product without further incorporation into solvents or modification of any type.

Example II

In this example the "Cab–O–Sil" silica catalyst was omitted. The reaction was run exactly as set out in Example I above, but the reaction time to achieve the suitable product was approximately 9½ hours in this instance. As in Example I, the product fell within the general structural formula with R being ethyl.

As mentioned above, when the products of the invention are used as foam inhibitors and foam preventors, they may be used as such without any further compounding or modification. If desired, however, the reaction products may be dispersed in aliphatic hydrocarbon oils such as mineral seal oil, kerosene, various light aliphatic fuel oils, gas oils, paraffin waxes, and the like.

In many instances emulsifying agents, such as polyoxyethylene glycols and polyalkylene glycols, as those marketed under the tradenames of "Ucon" and "Carbowax," may be added to the products of the invention or to their formulations in aliphatic hydrocarbon oil extenders. Compounds other than emulsifiers and extenders, such as dispersants and the like, may also be added to the compositions of the invention in order to obtain formulated products of the desired physical characteristics in order to overcome feeding problems, etc.

USE OF COMPOSITIONS AS ANTIFOAMS

The just-discussed products are useful in a wide variety of industrial processes which require control of foaming problems. Among these processes, the compositions may be used in the following: the feedwater of boilers such as wayside boilers; for use in non-frothing emulsions used in leather tanning, the textile industry, etc.; in cutting oils; for incorporation into dye baths, dye pastes, discharge pastes and the like; to prevent foaming and resultant loss of liquid from a circulating cooling system; in fermentation processes; in cooking with fats and oils; in lubricants; in petroleum processing units such as in units employed to distill crude oils; and in single or multiple-effect concentrators containing aqueous, organic or inorganic type materials and the like.

Besides use in the above varied processes involving a wide scope of environmental conditions, the compositions of the invention are also active in controlling foaming of latex emulsions used for paints or coatings and in inhibiting and controlling foam in pulp and paper manufacture such as in a kraft process. The compositions have found particular use in inhibiting foam normally occurring during preparation and concentration of natural or synthetic rubber latexes via rubber latex emulsion polymerization of such monomers as styrene, acrylonitrile, butadiene, isobutylene, isoprene, chloroprene and mixtures of any of the above. Soaps and surfactants used in the polymerization step cause severe foaming difficulties in absence of use of the defoaming and antifoam additives of the invention. Paper coatings such as butyl latex or polyvinyl chloride latex may likewise be treated during their production, with the instant antifoamers.

When used to control and inhibit foam in industrial areas, addition of as little as 1 p.p.m. of the compositions of the invention gives good foam inhibition and foam prevention. As much as 500 p.p.m. of antifoam may be used, with a preferred range between 1 and 100 p.p.m., and with the most preferred range being 1–25 p.p.m.

The compounds of the invention are effective over a wide range of pH conditions and under almost any combination of pressure and temperature conditions. The compositions when used as antifoam agents should preferably be added as close as possible to the source of the foam. For example, to inhibit foam created under conditions of distilling off unreacted monomer and/or solvents used during production of aqueous latex emulsions, as the type used in the paint and coating industries, the antifoam composition should be added directly to the reaction mass being processed, whereby it is actually present during the concentration step. Likewise, in a papermaking operation, since foaming difficulties occur in the screen boxes and the cylinders of a cylindrical papermaking machine or in the headbox of a Fourdrinier papermaking machine, it is preferred that antifoam application be made there. The antifoam compounds of the invention may also be added to the feed box or to the screen pump, screens, or showers of the cylinder machine, or to the fan pump, showers or wire pit of the Fourdrinier machine. When used for antifoam control in pulp and paper manufacture, as little as 0.1 pound of active antifoam per ton of pulp based on the weight of the dry fiber gives good results. As high as 20 pounds/ton may be used in extremely difficult foaming areas. In a preferred practice, between ¼ and 2 pounds of chemical are used per ton of fiber stock.

EVALUATION OF THE INVENTION

In order to determine the effectiveness of the antifoam compositions of the invention, and particularly their versatility in inhibiting and controlling foam under a wide variety of environmental conditions, various laboratory procedures were devised to simulate industrial conditions and test the efficiency of the reaction products of the invention.

The first test, known as a "Recirculation Test," was devised in order to determine the antifoam activity of the compositions of the invention with respect to paper pulp stock. A test stock was first prepared as follows: to 860 ml. of water containing 224 mg. calcium chloride, were added 140 grams of 16% total solids black liquor and 50 mls. of a 1% aqueous solution of a sodium salt of a rosin acid. 58 mls. of this solution were then added to a gallon jug. 18 grams of kraft pulp were pulped in 1,000 mls. of water and added to the jug containing the black liquor mixture. Stock was then made up to 1 gallon with tap water, well shaken and employed for the following test. In this test, 6 liters of the above paper stock containing pulp were placed in a glass pipe, 6″ in diameter and 18″ in height. The stock was recirculated through a 1½″ diameter hose by means of a pump which was running at 3,450 r.p.m. The amount of antifoam necessary to prevent foam buildup during the recirculation was then determined.

The composition of Example I was then tested for antifoam activity in the above discussed recirculation test. This product had excellent activity in preventing and inhibiting foam buildup and in deaerating the paper stock within the forementioned limits of chemical application per ton of paper stock.

Another test was performed in order to determine antifoam activity of the compositions of the invention with respect to latex paints. To a half-pint paint can was added 100 mls. of aqueous latex emulsion and 1 p.p.m. of the antifoam of Example I. The can was sealed and mounted in a shaker for 3 minutes. The contents were then poured into a weight per gallon cup and weighed to determine the weight loss due to aeration. A blank was also run, that is, the above test run in absence of antifoam. The sample in which the antifoam was present showed little loss of weight due to aeration, while the unprotected or blank sample showed weight losses as high as 30% due to foam formation. The above demonstrates the excellent activity of the antifoam compositions of the invention in preventing foaming problems of aqueous latex emulsion systems.

The antifoamers of the invention were also tested on acrylic emulsions and butyl rubber latex emulsions. These emulsions were used as test media in the above discussed recirculation test in replacement of paper pulp test stock. Excellent foam inhibition was noted in employment of antifoam in amounts from 1 p.p.m. to 100 p.p.m. based on the weight of the latex. In fact, the reaction products of the invention exhibited a considerably higher degree of antifoam activity than did commercially available silicones which were also similarly tested.

Another test was devised to determine antifoam activity of the compositions of the invention in agitated proteins. A protein test solution was prepared as follows: a de-oiled flaked soya protein (200 g.) was treated for one hour with 3.8 g. of sodium hydroxide in 3.8 liters of Chicago tap water at 104° F. The solution was filtered through an 80 mesh screen and the filtrate used for the following experiment. This was performed by placing 150 mls. of the freshly prepared protein stock in an "Osterizer" jar. The stock was beaten for 5 seconds until a thick, high foam was generated.

The antifoam was then added and blended in the stock for 20 seconds. The time for the surface to clear was then measured. Using varying amounts of the reaction product of Example I, the surface of the stock was cleared in from approximately ½ to 20 seconds. No stock precipitation was noted and the stock itself remained clear.

Example III

The product of Example I was evaluated in a Northwest paper mill engaged in processing hemlock and fir. Approximately 40 cc./min. of antifoam was added to a kraft brown stock washer in which the stock flow was 900–950 gallons per minute. The temperature of the stock going into the washer was 180–190° F., and the temperature of the slurry leaving was 90–100° F. The pH of the stock influent being washed was 11.0, and the effluent pH was 9.0. At the above dosage excellent antifoam inhibition was effected in the mill.

Example IV

In another field trial the antifoam of Example I was tested in a kraft mill and specifically in a kraft mill brown stock washer. During the test the through-put of the mill was maintained at about 340 tons per day. Excellent antifoaming and defoaming was achieved by addition of the product antifoam at a level of about 35 cc. per minute.

Various other media were also employed in the just described test. These included mixtures of hydrocarbon fluids and slurries of intermediate products from the mining industry. The antifoam compositions of the invention were evaluated in these synthetically prepared liquids under the above conditions of extreme agitation, and exhibited excellent antifoam inhibition. To further illustrate the effectiveness of the invention:

Example V

The antifoam of Example II was evaluated as a lubricating oil antifoam using the standard test, ASTM D892–63. In this test, 10 p.p.m. of the antifoam completely suppressed the production of foam.

Example VI

The antifoam of Example II was diluted in a hydrocarbon carrier for ease of handling. This formulation was evaluated in a major petroleum refinery as a delayed coker antifoam. The results of this trial showed that excellent defoaming was achieved.

The invention, of course, is not limited by the above examples of antifoam use which are meant to be merely illustrative of the type of media which may be foam controlled by the claimed compositions.

The invention is hereby claimed as follows:

1. A new composition of matter useful in defoaming and inhibiting foam formation consisting essentially of a polyoxyethylsilicoxyalkylboroxy oligomer having the following structural formula:

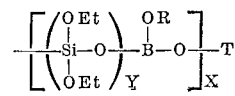

where Y is an integer ranging from 4 to 15, X is an integer ranging from 10 to 200, R is an organic alkyl radical containing from 1 to 18 carbon atoms, and T is from the group consisting of:

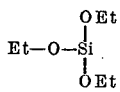

and

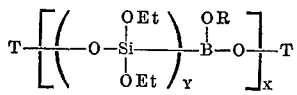

2. The composition of claim 1 wherein R is ethyl.

3. The process of defoaming and inhibiting foam formation in a system which normally tends to be foamable, which comprises the step of adding to such system in an amount sufficient to control said foam, a polyoxyethylsilicoxyalkylboroxy oligomer having the structural formula:

$$T\left[\left(-O-\underset{\underset{OEt}{|}}{\overset{OEt}{|}}Si-O\right)_Y-\overset{OR}{\underset{|}{B}}-O\right]_X-T$$

where Y is an integer ranging from 4 to 15, X is an integer ranging from 10 to 200, R is an organic alkyl radical containing from 1 to 18 carbon atoms, and T is from the group consisting of:

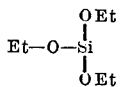

and

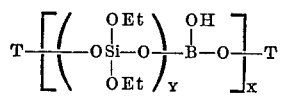

4. The process of claim 3 wherein said oligomer is added to said system in an amount of at least 1 p.p.m.

5. The process of defoaming and inhibiting foam formation in an aqueous system which normally tends to be foamable which comprises the step of adding to such system at least 1 p.p.m. of an antifoam composition comprising a polyoxyethylsilicoxyalkylboroxy oligomer having the following structural formula:

$$T\left[\left(-O\underset{\underset{OEt}{|}}{\overset{OEt}{|}}Si-O\right)_Y-\overset{OH}{\underset{|}{B}}-O\right]_X-T$$

where Y is an integer ranging from 4 to 15, X is an integer ranging from 10 to 200, R is an organic alkyl radical ranging from 1 to 18 carbon atoms, and T is from the group consisting of:

R— and

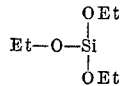

6. The process of claim 5 where said aqueous system is a latex emulsion.

7. The process of defoaming and inhibiting foam formation in a hydrocarbon liquid system which normally tends to be foamable which comprises the step of adding to such system at least 1 p.p.m. of an antifoam composition comprising a polyoxyethylsilicoxyalkylboroxy oligomer having the following structural formula:

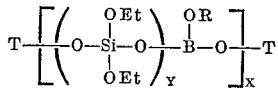

where Y is an integer ranging from 4 to 15, X is an integer ranging from 10 to 200, R is an organic alkyl radical ranging from 1 to 18 carbon atoms, and T is from the group consisting of:

R— and

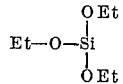

8. An improved method of preparing the oligomer of claim 1 which comprises the step of reacting a boron compound selected from the group consisting of trialkyl borates and boric anhydride together with a polyethyl silicate, said reaction being carried out by heating said boron compound and said polyethyl silicate in presence of finely divided silica having a surface area of at least 20 m.²/g.

References Cited

UNITED STATES PATENTS 3,267,042   8/1966   Domba _____ 252—321

FOREIGN PATENTS 706,781   4/1954   Great Britain.

LEON D. ROSDOL, *Primary Examiner.*

R. D. LOVERING, *Assistant Examiner.*

U.S. Cl. X.R.

252—358; 260—2, 29.6, 448.2, 448.8

UNITED STATES PATENT OFFICE
CERTIFICATE OF CORRECTION

Patent No. 3,422,027　　　　　　　　　　　　　January 14, 1969

Elemer Domba

It is certified that error appears in the above identified patent and that said Letters Patent are hereby corrected as shown below:

Column 1, lines 19 to 22 and column 8, lines 72 to 75, the formula, each occurrence, should appear as shown below:

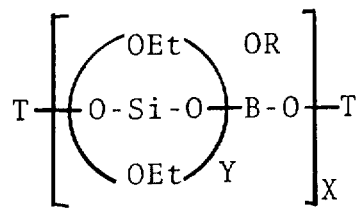

Column 1, line 49, "partcularly" should read -- particularly --. Column 3, lines 15 and 16, cancel "R- or" and insert the same before the formula in line 25, same column 3. Column 5, line 52, "figment" should read -- pigment --. Column 9, line 47, "OH" should read -- OR --.

Signed and sealed this 21st day of April 1970.

(SEAL)
Attest:

EDWARD M. FLETCHER, JR.　　　　　　WILLIAM E. SCHUYLER, JR.
Attesting Officer　　　　　　　　　　Commissioner of Patents